(12) United States Patent
Zadok

(10) Patent No.: US 6,793,228 B2
(45) Date of Patent: Sep. 21, 2004

(54) ANTI-ROLL SUSPENSION FOR AUTOMOBILES

(76) Inventor: Adam Zadok, 1623 S. 56th Ct., Cicero, IL (US) 60804

( * ) Notice: Subject to any disclaimer, the term of this patent is extended or adjusted under 35 U.S.C. 154(b) by 233 days.

(21) Appl. No.: 10/041,973

(22) Filed: Jan. 2, 2002

(65) Prior Publication Data

US 2003/0122336 A1 Jul. 3, 2003

(51) Int. Cl.[7] .................................................. B60G 3/04
(52) U.S. Cl. ........................... 280/124.134; 280/124.135
(58) Field of Search ................... 280/124.103, 124.106, 280/124.107, 124.146, 124.134, 124.135, 124.136

(56) References Cited

U.S. PATENT DOCUMENTS

| 2,152,938 A | | 4/1939 | Welch |
| 2,576,686 A | | 11/1951 | Kolbe |
| 2,580,558 A | | 1/1952 | Kolbe |
| 2,689,747 A | | 9/1954 | Kolbe |
| 2,787,473 A | | 4/1957 | Giuseppe |
| 2,796,267 A | | 6/1957 | Van Peborgh |
| 2,978,255 A | | 4/1961 | Rosenkrands |
| 3,137,513 A | | 6/1964 | Robert |
| 3,408,088 A | | 10/1968 | Corbin |
| 3,497,233 A | | 2/1970 | Bolaski |
| 3,604,724 A | | 9/1971 | Corbin |
| 4,043,584 A | | 8/1977 | Wagner et al. |
| 4,470,611 A | | 9/1984 | Duphily |
| 4,515,390 A | * | 5/1985 | Greenberg ............ 280/124.102 |
| 4,546,997 A | * | 10/1985 | Smyers ..................... 280/5.509 |
| 4,550,926 A | | 11/1985 | MacIsaac |
| 4,632,413 A | | 12/1986 | Hanma et al. |
| 4,685,690 A | | 8/1987 | Fujita et al. |
| 4,854,603 A | | 8/1989 | Scaduto |
| 5,048,858 A | * | 9/1991 | Luger .................. 280/124.136 |
| 5,080,389 A | | 1/1992 | Kawano et al. |
| 5,286,052 A | | 2/1994 | Lukianov |
| 5,324,056 A | * | 6/1994 | Orton ................... 280/124.106 |
| 5,431,429 A | * | 7/1995 | Lee ...................... 280/124.139 |
| 5,620,199 A | * | 4/1997 | Lee .......................... 280/5.521 |
| 5,700,025 A | | 12/1997 | Lee |
| 5,765,846 A | | 6/1998 | Braun |
| 6,056,303 A | * | 5/2000 | van der Knaap et al. 280/124.1 |
| 6,193,250 B1 | * | 2/2001 | Woo ..................... 280/124.107 |
| 6,467,783 B1 | * | 10/2002 | Blondelet et al. ...... 280/124.106 |
| 6,585,275 B1 | * | 7/2003 | Carlstedt et al. ....... 280/124.106 |

FOREIGN PATENT DOCUMENTS

| BE | 753.401 | 1/1971 |
| DE | 807 755 | 7/1951 |
| DE | 1201 698 | 9/1965 |
| DE | 19704498 | 4/1998 |
| EP | 0378028 | 7/1990 |
| EP | 1070609 | 1/2001 |
| FR | 2474967 | 8/1981 |
| GB | 1122515 | 8/1968 |
| GB | 1213795 | 11/1970 |

* cited by examiner

Primary Examiner—Paul N. Dickson
Assistant Examiner—Deanna Draper
(74) Attorney, Agent, or Firm—Gordon & Rees LLP

(57) ABSTRACT

An antiroll suspension for a vehicle chassis having laterally spaced wheels, the suspension comprises an axle assembly for rotatably mounting each of a pair of laterally spaced wheels, a spring assembly supporting the chassis on each of the axle assemblies, a moveable arm connected between the spring and the chassis, and an anti roll linkage connected between said chassis and the moveable arm of the axles of the suspension system being responsive to a lateral force on said chassis, and structured to translate lateral force on the chassis to a vertical force on the down force side of the chassis so that the anti roll linkage simultaneously lifts the down force side of the vehicle and lowers the up force side of the vehicle.

18 Claims, 8 Drawing Sheets

ANTI-ROLL SUSPENSION FOR AUTOMOBILES

BACKGROUND OF THE INVENTION

1. Field of the Invention

The present invention generally relates to automotive vehicle suspension systems, and pertains more particularly, to an automotive suspension system with means that is responsive to the inertial forces on the vehicle chassis to load the download side of the suspension for limiting vehicle body roll.

2. Discussion of the Related Art

A typical automotive vehicle has a body or chassis formed with an enclosed operator and passenger compartment with the body being resiliently supported by a suspension system on wheel assemblies that carry it over generally horizontal surface road and street surfaces. An automotive vehicle may be driven through the rear wheels, the front wheels or both. It typically has steerable front wheels and non-steerable rear wheels. The suspension system normally employs springs to support the body on the wheel assemblies, and with damping means in the form of hydraulic cylinders that act to dampen oscillations and movements of the body relative to the wheel assemblies.

The construction of the suspension system is often a compromise between a soft suspension for providing a soft ride for passenger comfort over rough roads and the like and a stiff suspension, which enhances the safety and stability of the vehicle. A stiffer suspension transfers more shock of the suspension to the chassis and offers less comfort to passengers but increases the stability of the vehicle. When the typical vehicle enters a turn the resulting centrifugal forces acting on the vehicle tend to roll the vehicle body about its roll center relative to the underlying suspension system. This centrifugal force also tends to displace the body laterally, outwardly tending to cause the vehicle to pivot about the contact of its outer wheels with the road surface.

The construction of a vehicle body and the configuration of the vehicle suspension systems determine the location of the roll center. In a conventional vehicle, the roll center of the vehicle is typically below the center of mass or gravity of the vehicle. Centrifugal forces tending to roll the vehicle body act on a lever arm or through a lever arm determined by the vertical distance between the center of gravity and the roll center. This is known as the roll couple.

As a vehicle moves through a turn the body tends to roll and shift the weight onto the outer wheels and springs while simultaneously unloading the inner suspension springs thereby reducing the cornering traction of the vehicle. The body also tilts or rolls toward the outside of the curve shifting the mass of the vehicle toward the outside of the curve. The rolling of the body about its roll center when negotiating a curve is discomforting to the operator and passengers. Stiffer suspensions which tend to reduce this tendency to roll also subject the passengers and operator to the jolting and jarring of rough roads.

A number of approaches to over coming this tendency of the vehicle to roll during cornering have been proposed in the past. One approach has been to provide the vehicle with anti-sway bars in the form of torsion bars between the two sides of the suspension. This approach helps reduce roll but is not satisfactory.

Another approach has been to provide the vehicle with a linkage system powered by electric motors to selectively tilt the body inwardly during cornering. Such a system is disclosed in U.S. Patent No. 2,152,938.

Others have attempted to overcome this problem by designing the suspension system so that the roll center of the vehicle is disposed above its center of gravity. Most of these systems are complicated and expensive. These systems also have other serious drawbacks.

Others have attempted to overcome this problem by designing the suspension system so that the roll center of the vehicle is disposed above its center of its gravity. Most of these systems are complicated and expensive. These systems also have other serious drawbacks. Accordingly there is a need for an improved anti roll suspension system that over comes the above problems of the above prior art.

SUMMARY OF THE INVENTION

The present invention solves the problem of excessive vehicle body roll. Broadly, the present invention provides a suspension system having a linkage that translates lateral body movement into a lift force on the down load side of the body.

More specifically, one embodiment of the invention comprises an anti roll suspension for a vehicle chassis having at least two laterally spaced wheels, wherein the suspension comprises an axle assembly for rotatably mounting each of a pair of laterally spaced wheels, a spring assembly supporting the chassis on each of the axle assemblies, a moveable arm connected between the spring and the chassis, and an anti roll linkage connected between said chassis and the moveable arm of the axles of the suspension system being responsive to a lateral force on said chassis, and structured to translate lateral force on the chassis to a vertical force on the down force side of the chassis so that the anti roll linkage simultaneously lifts the down force side of the vehicle and lowers the up force side of the vehicle. However, the claims alone, not the preceding summary, define the invention.

BRIEF DESCRIPTION OF THE DRAWINGS

The nature, goals, and advantages of the invention will become more apparent to those skilled in the art after considering the following detailed description when read in connection with the accompanying drawing—illustrating by way of examples the principles of the invention—in which like reference numerals identify like elements throughout wherein.

Figure 1:
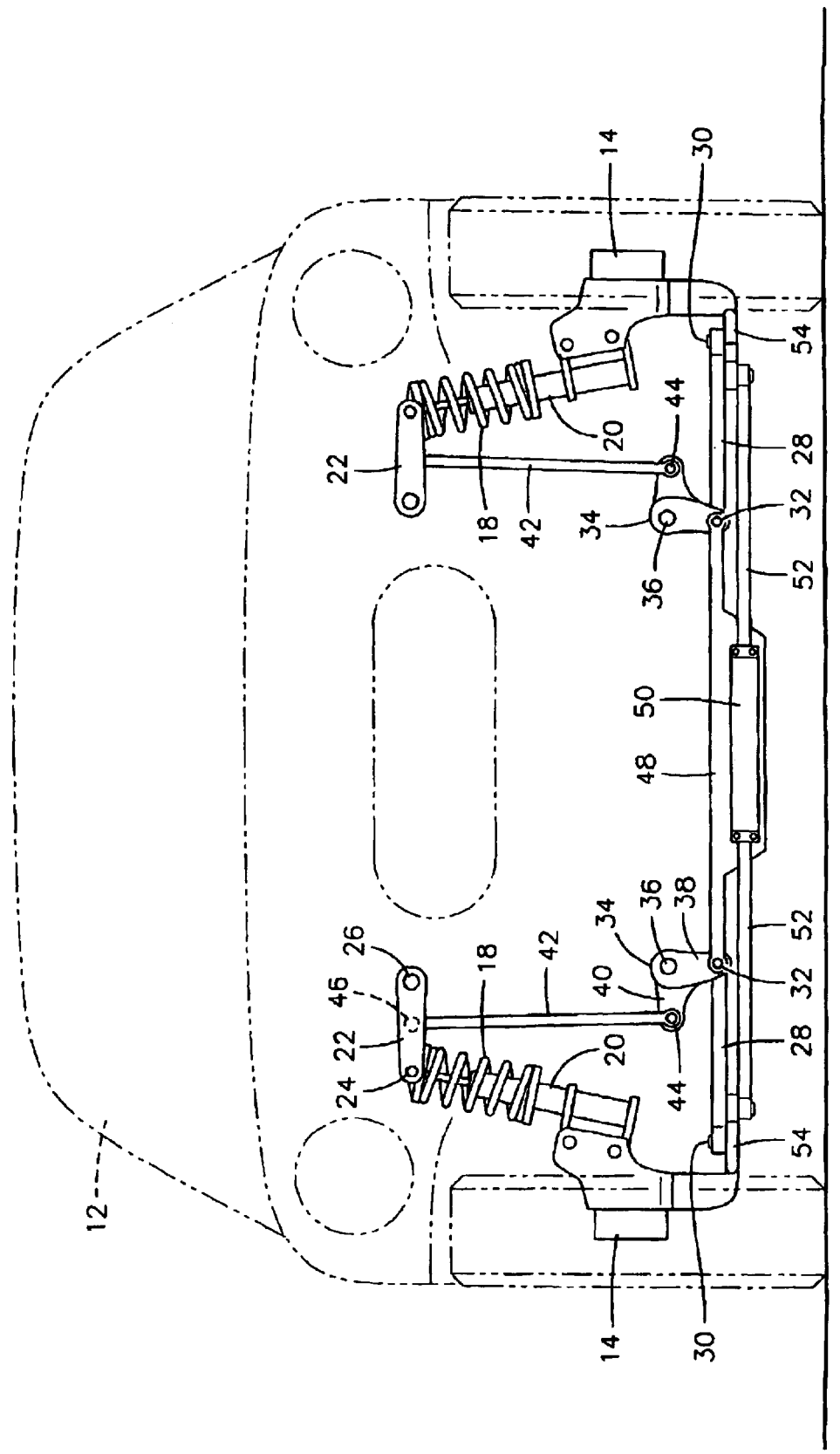
FIG. 1 is a front elevation view of a vehicle shown in phantom showing the front of one embodiment of the invention showing the vehicle body in a static condition.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in detail by way of example with reference to the attached drawings. In the description, the parts and components of the present invention, which are the same, will be referred to by the same or similar reference symbols.

Unless defined otherwise, all technical and scientific terms used herein have the same meaning as is commonly understood by one of skill in the art to which this invention belongs. In event the definition in this section is not consistent with definitions elsewhere, the definitions set forth in this section will control.

Throughout this description, the preferred embodiment and examples shown should be considered as exemplars, rather than as limitations on the present invention. As shown in the drawing for purposes of illustration, a suspension system according to the invention provides a rapid loading of the down load side springs in response to a lateral force on the vehicle chassis such as in a turn to reduce or eliminate roll of the vehicle body. A suspension system according to the invention provides a more comfortable ride for operator and passengers by reducing or eliminating roll of the body as the vehicle negotiates turns. The suspension system of this invention is also simple and easily fabricated and installed with little or no alteration in existing vehicle design.

Figure 2:
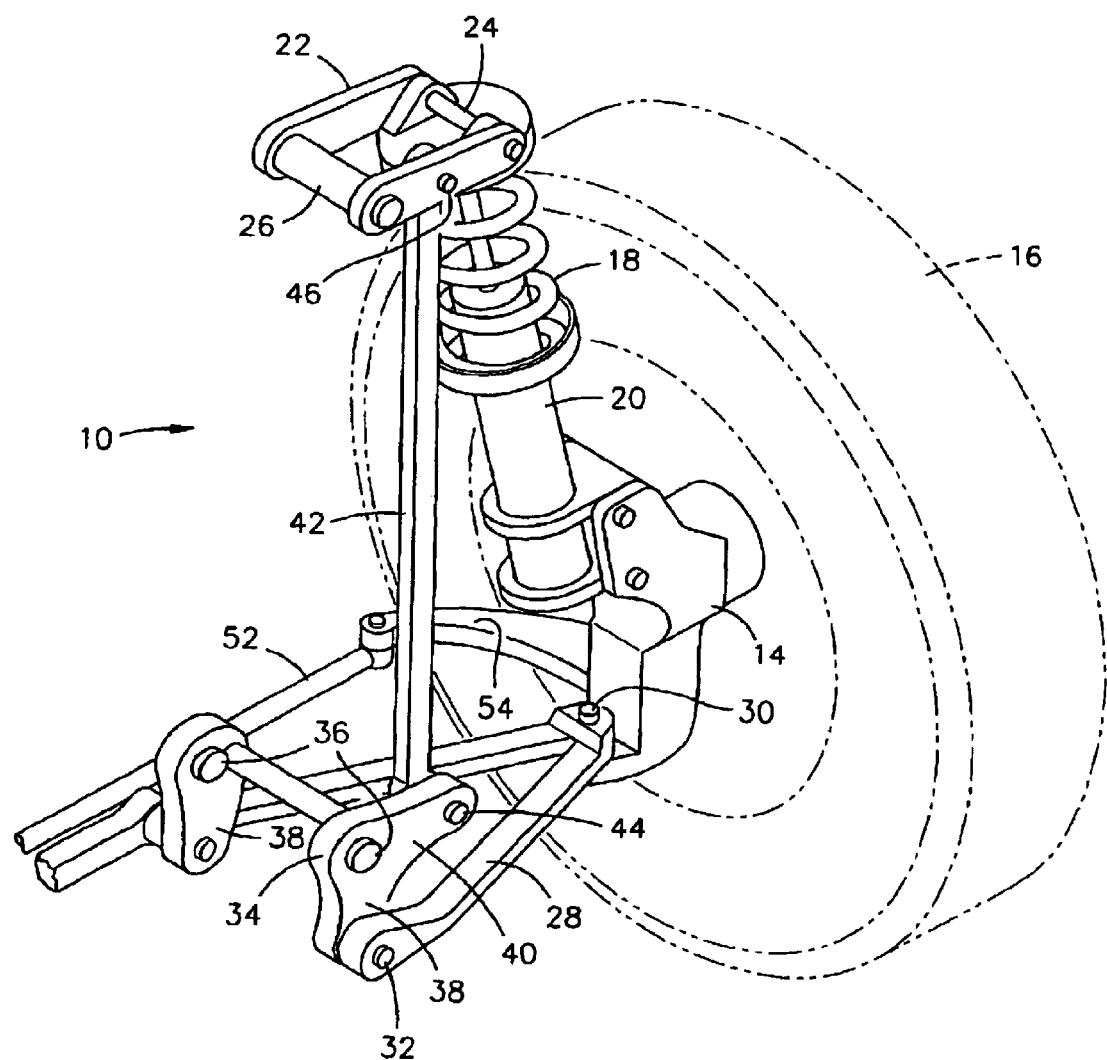
FIG. 2 is a perspective view of one side of the embodiment of FIG. 1.
Figure 3:
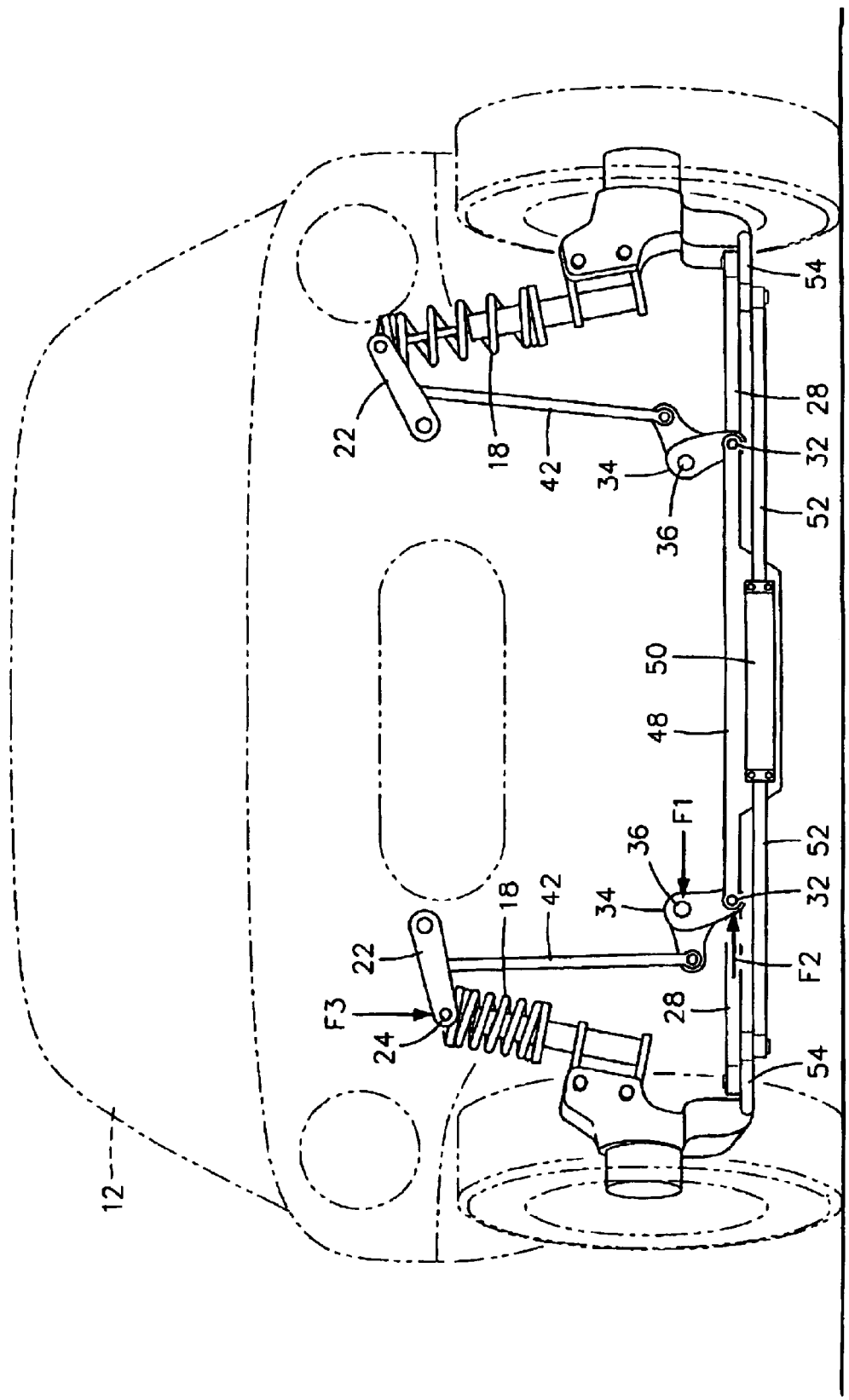
FIG. 3 is a view like FIG. 1 showing the condition of the front suspension with the vehicle in a turn.

Referring to FIGS. 1–3, an anti-roll suspension system in accordance with one embodiment of the invention for a front suspension of a vehicle is illustrated and designated generally by the numeral 10. The suspension system is shown supporting the front of a typical automotive vehicle with the vehicle chassis or body 12 shown in phantom. The anti-roll suspension system is devised for a vehicle chassis having two laterally spaced independently sprung steerable front wheels. The front wheels may be driven, even though the drive is not shown herein. The suspension system comprises an axle assembly 14 for independently and rotatably mounting each of a pair of laterally spaced wheels 16.

The vehicle chassis 12 is supported on each of the axle assemblies by a McPherson strut including a coil compression spring 18 and a hydraulic damping cylinder assembly 20. The strut is directly secured at the lower end to axle 14 and at the upper end to an upper arm 22 at a pivot pin 24. Upper arm 22 is pivotally connected by a suitable pivot pin or the like at 26 directly to the chassis or body of a vehicle. A lower control arm assembly or unit 28 is connected at an outer end at pivot 30 to wheel axle assembly 14 and at an inner end by floating pin 32 to a bell crank type lever 34 mounted at a pivot 36 to the vehicle chassis.

Bell crank 34 has a short arm 35 and a long arm 40. Lower control arm 28 is pivotally connected to the short arm 38 of bell crank type lever 34. A compensating link 42 is connected at a lower end at 44 to the arm 40 of bell crank 34 and at the upper end at 46 to lever or upper control arm 22. This link translates rotary movement of bell crank 34 to a movement of lever 22 to compress or relax spring 18. Bell crank 34 rotates in response to any lateral movement of the vehicle chassis toward or away from the wheels. The opposite side of the vehicle chassis is supported on an identical suspension with all components identified by the same reference numerals. A connecting link or bar 48 is pivotally connected at 32 to each short or lower arm 38 of each bell crank of each wheel suspension assembly. This bar or link ties compensating linkage of both sides of the suspension system together to work together in countering any tendency of the chassis to roll when cornering. In the instant system the link serves to translate a movement of the chassis and the moveable arm of the axles of the suspension system to a vertical force on the down force side of the chassis so that the anti roll linkage simultaneously lifts the down force side of the vehicle and lower the up force side of the vehicle.

A steering box 50 is mounted on and carried by tie bar 48 connected between the levers 34 of the two front wheel assemblies. The steering box may be either hydraulic or rack and pinion and will have the usual connection such as a shaft or hydraulic line (not shown) from the steering wheel for operation thereof. The steering box is connected by steering link to a steering arm on each of the wheel assemblies. This mounts the steering box to remain and move with the wheels rather than move with the chassis. This mounting avoids the introduction of movement of the chassis relative to the wheels into the steering of the wheels.

Referring to FIG. 3 it will be seen that the suspension system wheel assemblies are tied together by a tie link or bar 48 and will function together through the compensating linkage when the vehicle is in a turn. As shown in FIG. 3 the action of the suspension system of the present invention in a turn is illustrated. The vehicle, shown in a left turn, remains substantially level as the suspension system functions through the compensating linkage to maintain the vehicle chassis level as the vehicle passes through a turn. As shown the front of a vehicle in a severe left turn is illustrated with the chassis shifted to the left relative to the axle and wheels of the vehicle. This movement of the vehicle chassis actuates the linkage with the movement translated by the linkage to action on the springs and a resultant maintenance of the chassis in a level condition. As will be appreciated the center of mass of the vehicle body or chassis will be above the center of axles 14 and in a severe left-hand turn as illustrated will shift to the left and will also tend to roll counter-clockwise about its center of rotation. The center of rotation may not be located at the center of mass of the chassis but it most likely will be below the center of mass.

The movement of the vehicle into a turn as illustrated will result in the body or chassis shifting to the right relative to the axle of the vehicle thereby imposing a force F1 to the left on pivot connection 36 of the levers 34. Simultaneously a force F2 will be imposed to the right by the link 48 and arms 28 from the axle on the pivot 32 of the small arm of the lever 34. These forces will impose a counter-clockwise rotation or pivoting of the lever 34 about its pivot point or joint 36 thereby imposing a downward force F3 on the left-hand spring as viewed in FIG. 3, and an upward force on the pivot pin 24 of the right-hand lever 22. This action will simultaneously load the compression spring 18 on the right counteracting the tendency of the body of the vehicle to roll to the left.

As will be appreciated, compression springs increase in resistance with increasing displacement. Therefore, the greater displacement of the spring on the left increases the lift or support by that spring on the vehicle body. Simultaneously the extension of the spring on the right reduces the lift or support by that spring and simultaneously allows the right side of the body to remain in place or drop down thus reducing the roll of the body to the left. This results in a counteraction of the tendency of the vehicle to roll and thereby maintains the vehicle body or chassis substantially level as the vehicle goes through a turn. The response of the suspension to bumps or obstacles and depressions in the roadway is similar and maintains the vehicle body in a level condition.

Figure 4:
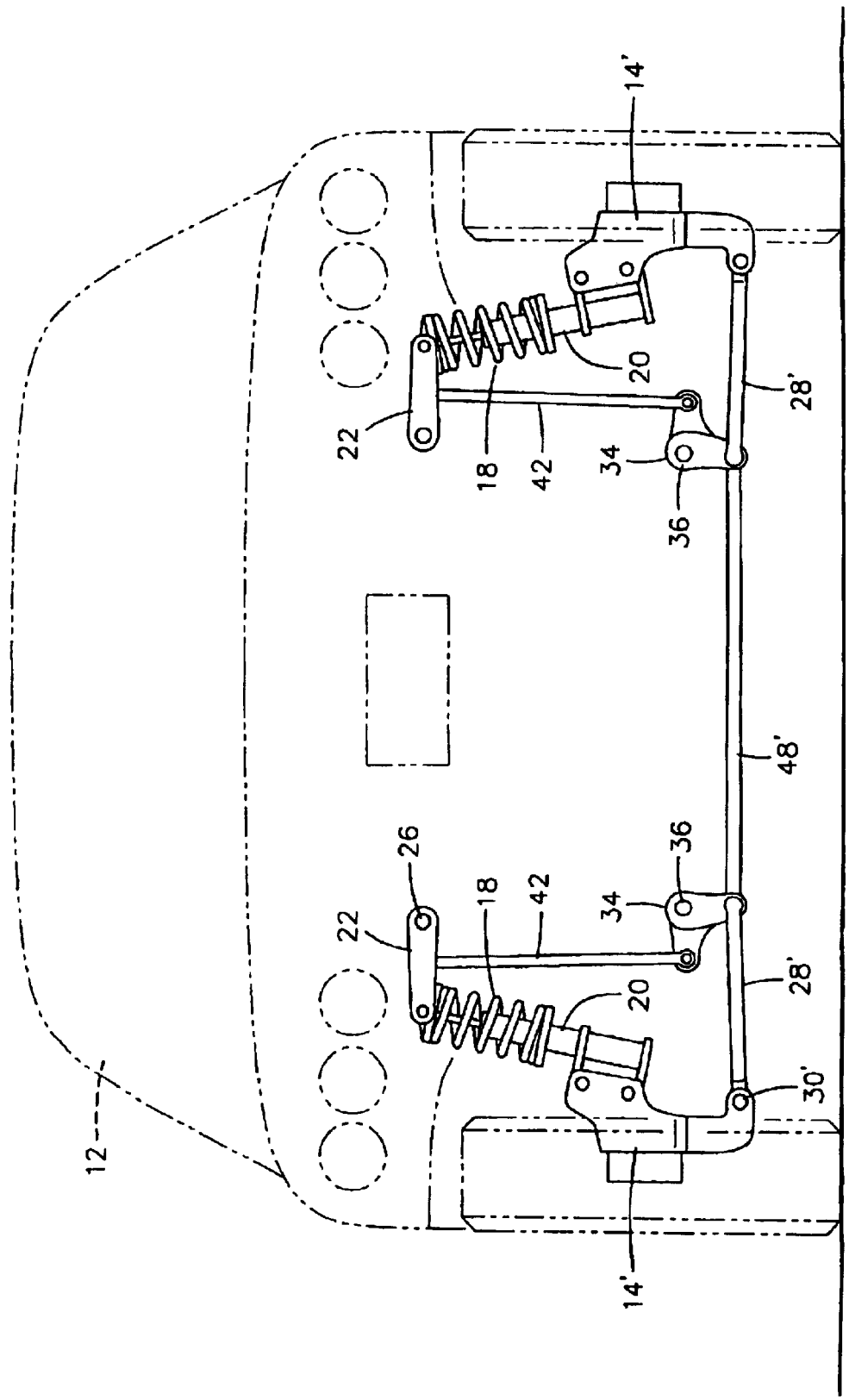
FIG. 4 is an elevation view of the rear of the vehicle of FIG. 1 and the embodiment of the invention showing the vehicle body in a static condition.
Figure 5:
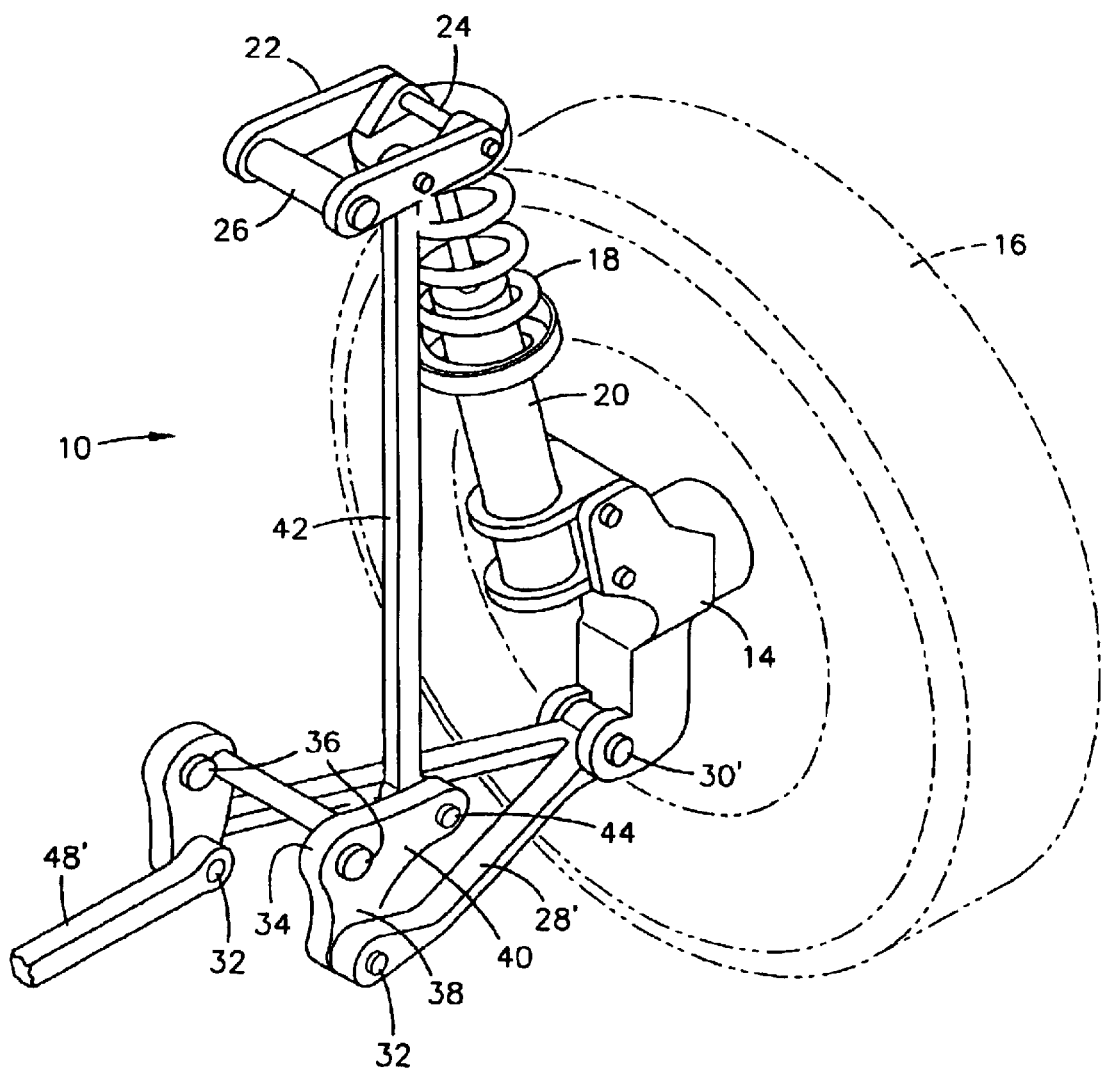
FIG. 5 is a perspective view of one side of the embodiment of FIG. 4.
Figure 6:
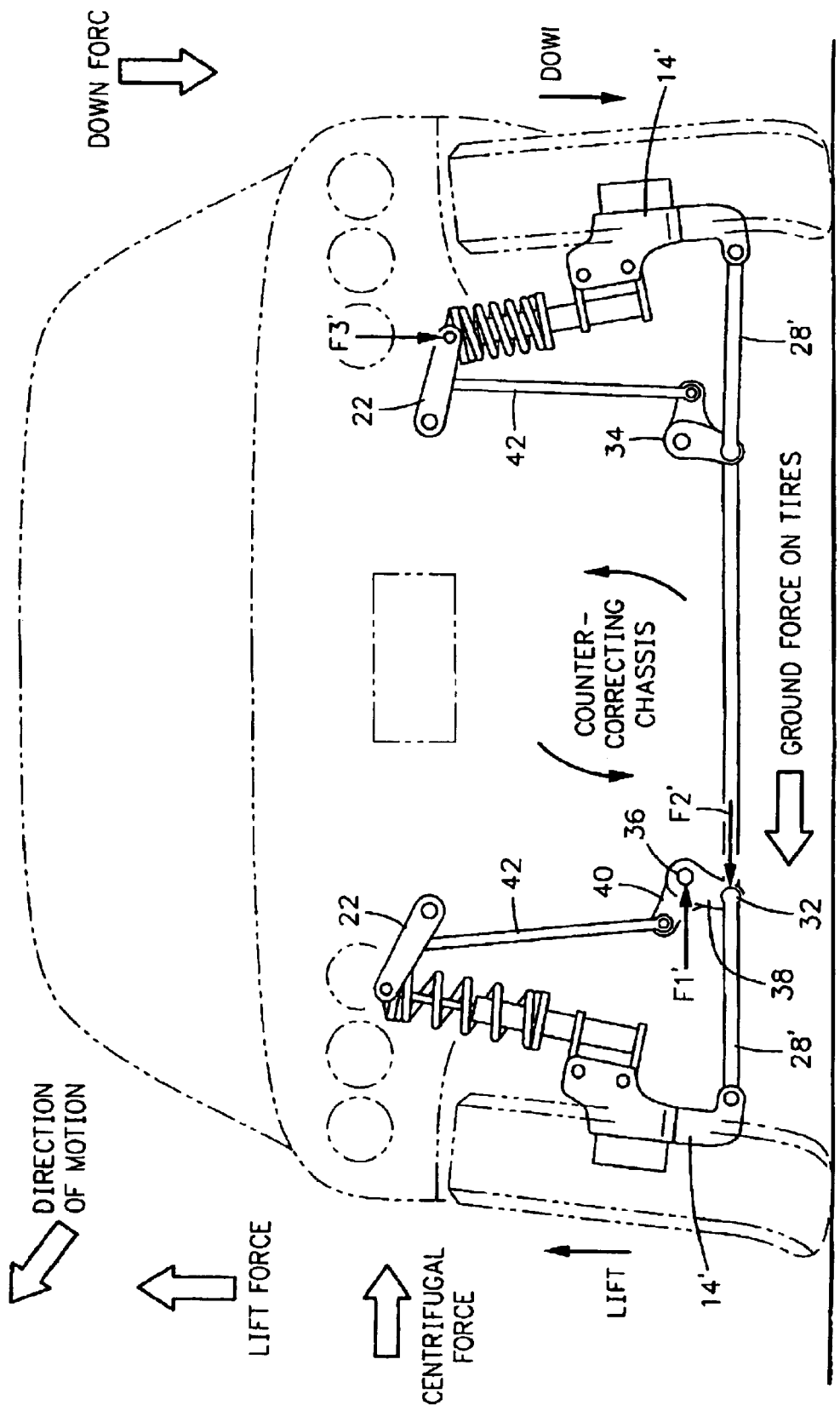
FIG. 6 is a view like FIG. 4 of the invention showing the condition of the rear suspension with the vehicle in a turn.

Referring to FIGS. 4–6, a rear suspension system substantially identical to that of FIGS. 1–3 is illustrated and applied to the rear of the vehicle chassis 12. The same reference numerals are used to identify the same or identical components and the same number primed will identify modified components. It will be seen that the major portion of the suspension system and compensating linkage system from bell cranks 34 outward and upward is the same as in the prior embodiment. The main difference in the suspension is that the wheels in this embodiment are fixed and not steerable. Thus, the axles are different and the steering is absent. No drive train is shown to the wheels as either front or rear wheels may be driven with little or no alteration in the suspension.

A tie bar or link 48' is connected between the short arms of the bell cranks 34 of the compensating linkage. The tie bar is independent and does not carry a steering box as in the front suspension embodiment. The lower control arms 28' will also differ in that pivoting at the axle will be about a pin 30' about a horizontal axis rather than a vertical or ball joint as in the front system.

As shown in FIG. 6 the action of this embodiment of the suspension system of the present invention as viewed from the rear in a severe left turn is illustrated. The vehicle, shown in a left turn, remains substantially level as the suspension system functions through the compensating linkage to maintain the vehicle chassis level as the vehicle passes through a turn as in the previously described embodiment. As shown from the rear of the vehicle in a severe left turn the chassis is shifted to the right relative to the axle and wheels of the vehicle. This movement of the vehicle chassis actuates the linkage with the movement translated by the linkage to a loading of the springs and a resultant maintenance of the chassis in a level condition. The center of mass of the vehicle body or chassis will be above the center of axles 14' and in a left-hand turn as illustrated will shift to the right and will also tend to roll clockwise about its center of rotation. The center of rotation will be below the center of mass.

The movement of the vehicle into a left turn as illustrated will result in the body or chassis shifting to the right relative to the wheels and axles of the vehicle thereby imposing a force F1' to the right on pivot connection 36 of the levers 34. Simultaneously a force F2' will be imposed to the left by the link 48' and on lever arm 38 from the axle on the small arm 38 of the lever 34. These forces will impose a clockwise rotation or pivoting of the lever 34 about its pivot point or joint 36 thereby imposing a downward force F3' on the right-hand spring as viewed in FIG. 6, and an upward force on the pivot pin 24 of the left-hand lever 22. This action will simultaneously load the compression spring 18 on the right and unload the compression spring 18 on the left counteracting the tendency of the body of the vehicle to roll to the right. The linkage magnifies the movement of the chassis and transfers that movement to the load connection of the chassis to the support on the springs. In other words the compression of the springs are magnified when the chassis is in a turn.

FIG. 6 also illustrates the forces acting on the vehicle body as a result of the centrifugal forces from changing direction such as going into and through a turn. Centrifugal force will act on the body to the right as a result of the change in direction with a ground force to the left acting on the tires at the point of contact with the ground or road surface. This will result in a lifting force on the left side of the body and a down force on the right side of the body tending to roll it about its roll center or axis. These forces are countered by a counter-correcting force of the suspension system with its linkage system thus, maintaining the vehicle chassis and body in a substantially level condition.

Figure 7:
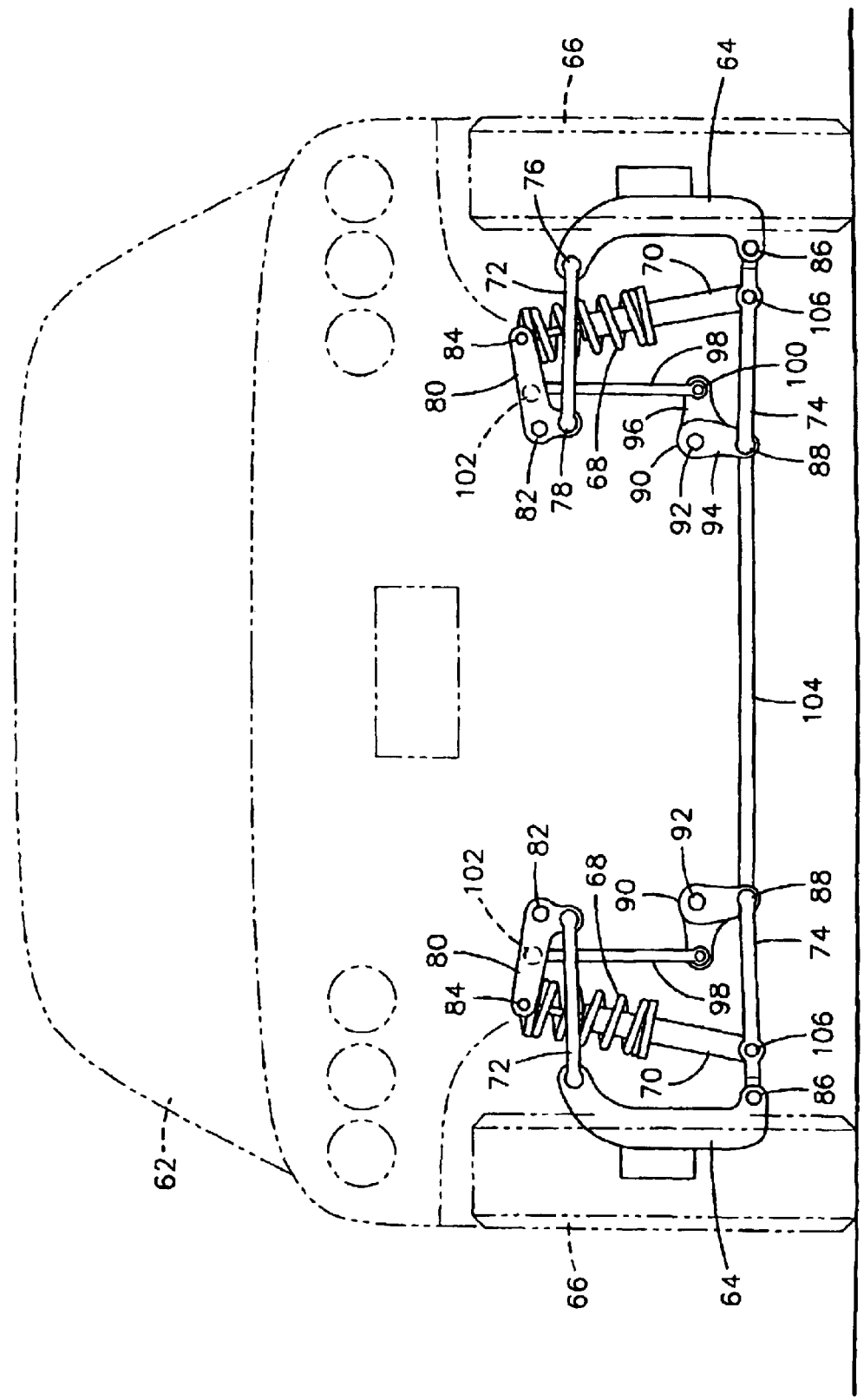
FIG. 7 is a view like FIG. 1 showing an alternate embodiment of the rear suspension in a static condition.
Figure 8:
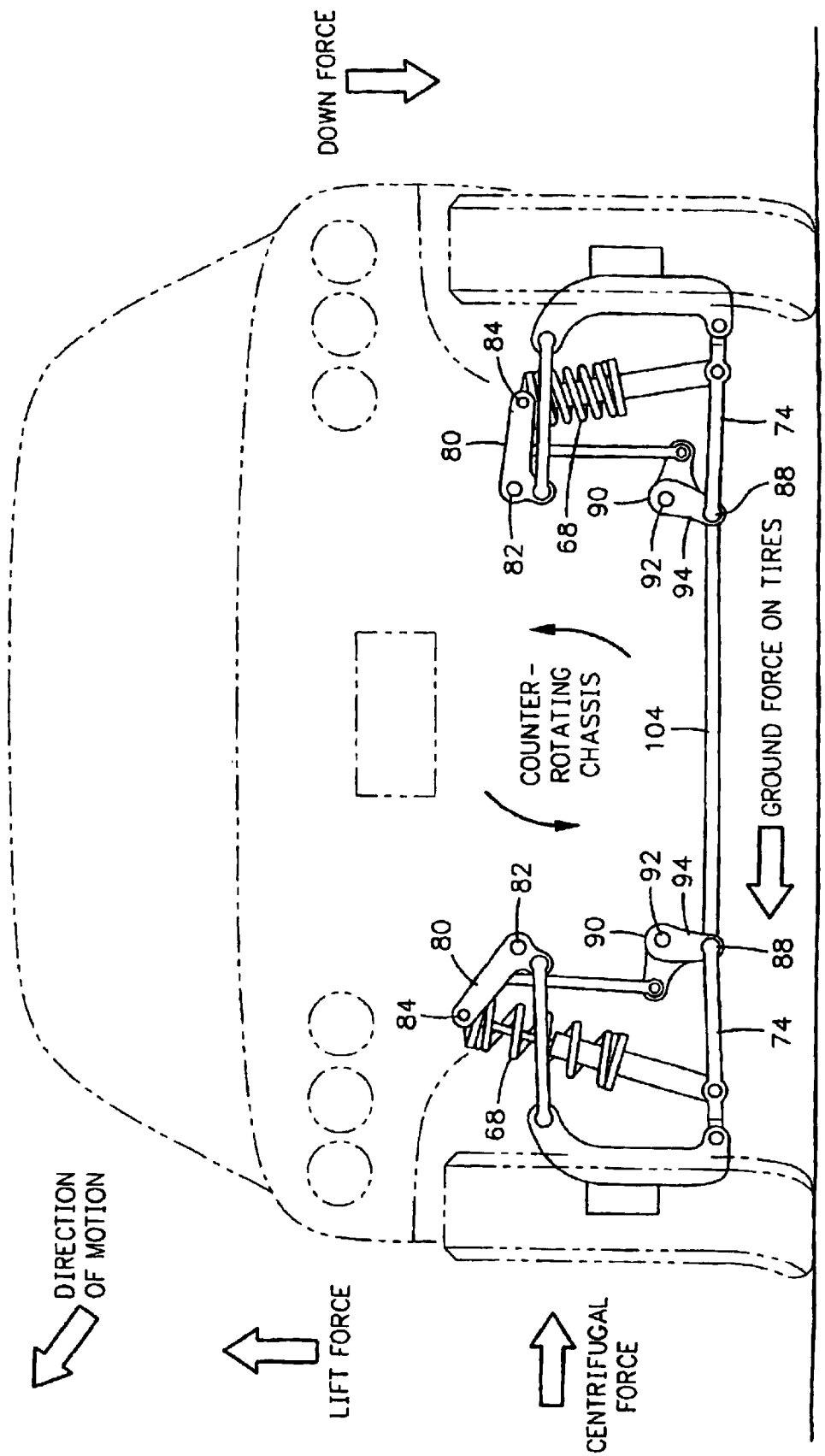
FIG. 8 is a view like FIG. 6 of the embodiment of FIG. 7 showing the condition of the rear suspension with the vehicle in a turn.

Referring to FIGS. 7–8, an alternate embodiment of a rear suspension system similar to that of FIGS. 4–6 is illustrated and designated by the numeral 60. The suspension system is shown supporting the rear of a typical automotive vehicle with the vehicle chassis or body 62 shown in phantom. The anti-roll suspension system is devised for a vehicle chassis having two laterally spaced independently sprung rear wheels. The wheels may be driven, even though the drive is not shown herein. The suspension system comprises an axle assembly 64 for independently and rotatably mounting each of a pair of laterally spaced wheels 66.

The vehicle chassis 62 is supported on each of the axle assemblies by a strut assembly including a coil compression spring 68 and a hydraulic damping cylinder assembly 70. The axles are moveably connected to the chassis by an upper control arm 72 and a lower control arm 74. This is typically called a double wishbone suspension. The strut is directly secured at the lower end to lower control arm 74 and at the upper end to an upper arm 80 at a pivot pin 102. Upper control arm 72 is pivotally connected at an outer end by a suitable pivot pin or the like at 76 to the axle 64 and at an inner end at pivot 78 to a lever 80. Lever 80 is pivotally connected at 82 directly to the chassis or body of the vehicle and at an outer end of a long arm at 84 to the top of spring 68. Upper lever 80 is a bell crank and is pivotally connected between its arms by a suitable pivot pin or the like at 82 directly the chassis or body of vehicle 62.

Lower control arm assembly or unit 74 is connected at an outer end at pivot 86 to wheel axle assembly 64 and at an inner end by floating pin 88 to a bell crank type lever 90 mounted at a pivot 92 to the vehicle chassis. Bell crank 90 has a downward extending short arm 94 and an outward extending long arm 96. Lower control arm 74 is pivotally connected to the short arm 94 of bell crank type lever 96. A compensating link 98 is connected at a lower end at 100 to the arm 96 of bell crank 90 and at the upper end at 102 to upper lever or arm 80. This link translates rotary movement of bell crank 90 to a movement of lever 80 to compress or relax spring 68. Bell crank 90 rotates in response to any lateral movement of the vehicle chassis relative to toward or away from the wheels. The opposite side of the vehicle chassis is supported on an identical suspension with all components identified by the same reference numerals. A connecting link or bar 104 is pivotally connected at 88 to each short or lower arm 94 of each bell crank of each wheel suspension assembly. This bar or link ties compensating linkage of both sides of the suspension system together to work together in countering any tendency of the chassis to roll when cornering. In this system the compensating link serves to translate a movement of the chassis and the moveable arm of the axles or the suspension system to a vertical force on the down force side of the chassis so that the anti roll linkage simultaneously lifts the down force side of the vehicle and lower the up force side of the vehicle.

As shown in FIG. 8 the action of the suspension system of the present invention in a turn is illustrated and functions as in prior embodiments. The vehicle, shown in a left turn, remains substantially level as the suspension system functions through the compensating linkage to maintain the vehicle chassis level as the vehicle passes through a turn. As shown the rear of a vehicle in a severe left turn is illustrated with the chassis shifted to the right relative to the axle and wheels of the vehicle. This movement of the vehicle chassis actuates the linkage with the movement of the chassis translated by the linkage to action on the springs and a resultant maintenance of the chassis in a level condition. As previously discussed the center of mass of the vehicle body or chassis will be above the center of the axles 64 and in a severe left hand turn as illustrated will shift to the right and will also tend to roll clockwise about its center of rotation. The center of rotation most likely will be below the center of mass.

The movement of the vehicle into a left turn as illustrated will result in the body or chassis shifting to the right relative to the wheels and axles of the vehicle thereby imposing a force to the right on pivot connection 92 of the levers 90. Simultaneously a force will be imposed to the left by the link 104 and on lever arm 94 from the axle on the arm of the lever 90. These forces will impose a clockwise rotation or pivoting of the lever 90 about its pivot point or joint 92 thereby imposing a downward force on the right-hand spring as viewed in FIG. 8, and an upward force on the pivot pin 82 of the left-hand lever 80. This action will simultaneously load the compression spring 68 on the right and unload the compression spring 68 on the left counteracting the tendency of the body of the vehicle to roll to the right. The linkage magnifies the movement of the chassis and transfers that movement to the load connection of the chassis to the support on the springs. In other words the compression of the springs is magnified when the chassis is in a turn.

FIG. 8 also illustrates the forces acting on the vehicle body as a result of the centrifugal forces from any changing of direction such as going into and through a turn. Centrifugal forces acting on the body to the right as a result of the change in direction will be countered by a ground force to the left acting on the tires at the point of contact with the ground or road surface. This will result in a lifting force on the left side of the body and a down force on the right side of the body tending to roll it about its roll center or axis. These forces are countered by a counter-correcting force of the suspension system with its linkage system thus, maintaining the vehicle chassis and body in a substantially level condition.

In the instant system the link serves to translate a movement of the chassis and the moveable arm of the axles of the suspension system to a vertical force on the down force side of the chassis so that the anti roll linkage simultaneously lifts the down force side of the chassis and lowers the up force side of the chassis.

While certain preferred embodiments have been described above, it is to be understood that a latitude of modification and substitution is intended in the foregoing disclosure, and that these modifications and substitutions are within the literal scope, or are equivalent to, the claims that follow.

Accordingly, it is appropriate that the following claims be construed broadly and in a manner consistent with the spirit and scope of the invention herein described.

What is claimed is:

1. An anti-roll suspension system for a vehicle chassis having at least two laterally spaced front wheels and two laterally spaced rear wheels, the suspension comprising:
    an axle assembly for mounting each of a pair of laterally spaced front wheels;
    an axle assembly for mounting each of a pair of laterally spaced rear wheels;
    a spring assembly comprising a spring for mounting the chassis on each of the axle assemblies;
    a moveable arm connected between each spring assembly and the chassis; and
    an anti roll linkage connected to said chassis and to said moveable arm, said anti roll linkage comprising a bell crank for pivotal mounting to a vehicle chassis having one arm connected to an axle assembly and a compensating link connecting another arm to said moveable arm for receiving and translating said lateral movement to said moveable arm, such that said anti roll linkage translates a lateral movement of the chassis to a vertical downward movement of said moveable arm to the spring on a down force side of the chassis and a vertical upward movement of said moveable arm to the spring on an up force side of the chassis so that the anti roll linkage simultaneously lifts the down force side of the chassis and lowers the up force side of the chassis.

2. An anti-roll suspension according to claim 1 wherein said spring is a coil compression spring normally disposed in a substantially vertical orientation.

3. An anti-roll suspension according to claim 1 wherein said spring is a coil compression spring normally disposed in a substantially vertical orientation.

4. An anti-roll suspension according to claim 3 wherein each of said axle assemblies is independently supported on said chassis.

5. An anti-roll suspension according to claim 4 wherein each of said spring assemblies embodies a McPherson strut.

6. An anti-roll suspension according to claim 4 wherein said anti roll linkage is independently supported between said laterally spaced wheels by a tie link.

7. An anti-roll suspension according to claim 6 wherein:
    said laterally spaced wheels are front wheels; and
    a steering box for said front wheels is mounted on said tie link.

8. An anti-roll suspension according to claim 3 wherein said moveable arm of each of said spring assemblies is a bell crank having one arm connected to an axle.

9. An anti-roll suspension according to claim 8 wherein each of said spring assemblies is embodied in a double wishbone suspension.

10. An anti-roll suspension according to claim 9 wherein each of the double wishbone suspensions includes an upper control arm and a lower control arm, and each control arm is attached to said chassis by a bell crank.

11. An anti-roll suspension for a vehicle chassis having at least two laterally spaced front wheels and two laterally spaced rear wheels, the suspension comprising:
    an axle assembly for mounting each of a pair of laterally spaced front wheels;
    an axle assembly for mounting each of a pair of laterally spaced rear wheels;
    a spring assembly comprising a spring for mounting the chassis on each of the axle assemblies;
    a moveable arm pivotally mounted on the chassis and connected to each spring assembly, and
    an anti roll linkage connected to said chassis and to said moveable arm, said anti roll linkage comprising a bell crank for pivotal mounting top vehicle chassis having one arm connected to support an axle assembly, and a compensating link connecting another arm to said moveable arm for receiving and translating said lateral movement to said moveable arm, such that said anti roll linkage translates a lateral movement of the chassis relative to an axle assembly to a vertical downward movement of said moveable arm to the spring on a down force side of the chassis and a vertical upward movement of said moveable arm to the spring on an up force side of the chassis so that the anti roll linkage simultaneously lifts the down force side of the chassis and lowers the up force side of the chassis.

12. An anti-roll suspension according to claim 11 wherein said spring is a coil compression spring normally disposed in a substantially vertical orientation.

13. An anti-roll suspension according to claim 12 wherein each of said axle assemblies is independently supported on said chassis.

14. An anti-roll suspension according to claim 13 wherein each of said spring assemblies embodies a McPherson strut.

15. An anti-roll suspension according to claim 12 wherein said anti roll linkage is interconnected between said laterally spaced wheels by a tie link.

16. An anti-roll suspension according to claim 15 wherein:

said laterally spaced wheels are front wheels; and a steering box for said front wheels is mounted on said tie link.

17. An anti-roll suspension according to claim 15 wherein said moveable arm of each of said spring assemblies is a bell crank having one arm connected to an axle.

18. An anti-roll suspension according to claim 17 wherein:

each of said spring assemblies is embodied in a double wishbone suspension;

each of the double wishbone suspensions includes an upper control arm and a lower control arm; and each control arm is attached to said chassis by a bell crank.

* * * * *